United States Patent [19]

Ahrens et al.

[11] 4,281,256

[45] Jul. 28, 1981

[54] COMPRESSED AIR ENERGY STORAGE SYSTEM

[75] Inventors: Frederick W. Ahrens; George T. Kartsounes, both of Naperville, Ill.

[73] Assignee: The United States of America as represented by the United States Department of Energy, Washington, D.C.

[21] Appl. No.: 39,412

[22] Filed: May 15, 1979

[51] Int. Cl.³ ............................................. F04B 17/00
[52] U.S. Cl. .................................... 290/1 R; 290/4 R
[58] Field of Search .................................. 290/1, 4, 52

[56] References Cited

U.S. PATENT DOCUMENTS

| 3,866,058 | 2/1975 | Lenssen | 290/52 |
| 3,869,857 | 3/1975 | Margen | 290/52 X |
| 4,077,748 | 3/1978 | P UMl/o/ tz | 290/4 X |
| 4,117,343 | 9/1978 | Hoffeins | 290/52 |
| 4,124,805 | 11/1978 | Jacoby | 290/1 |

Primary Examiner—Stanley J. Witkowski
Assistant Examiner—W. E. Duncanson, Jr.
Attorney, Agent, or Firm—Frank H. Jackson; Dean E. Carlson; James E. Denny

[57] ABSTRACT

An internal combustion reciprocating engine is operable as a compressor during slack demand periods utilizing excess power from a power grid to charge air into an air storage reservoir and as an expander during peak demand periods to feed power into the power grid utilizing air obtained from the air storage reservoir together with combustible fuel. Preferably the internal combustion reciprocating engine is operated at high pressure and a low pressure turbine and compressor are also employed for air compression and power generation.

7 Claims, 3 Drawing Figures

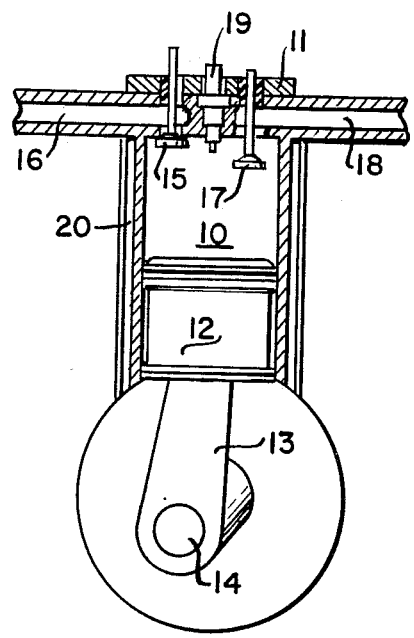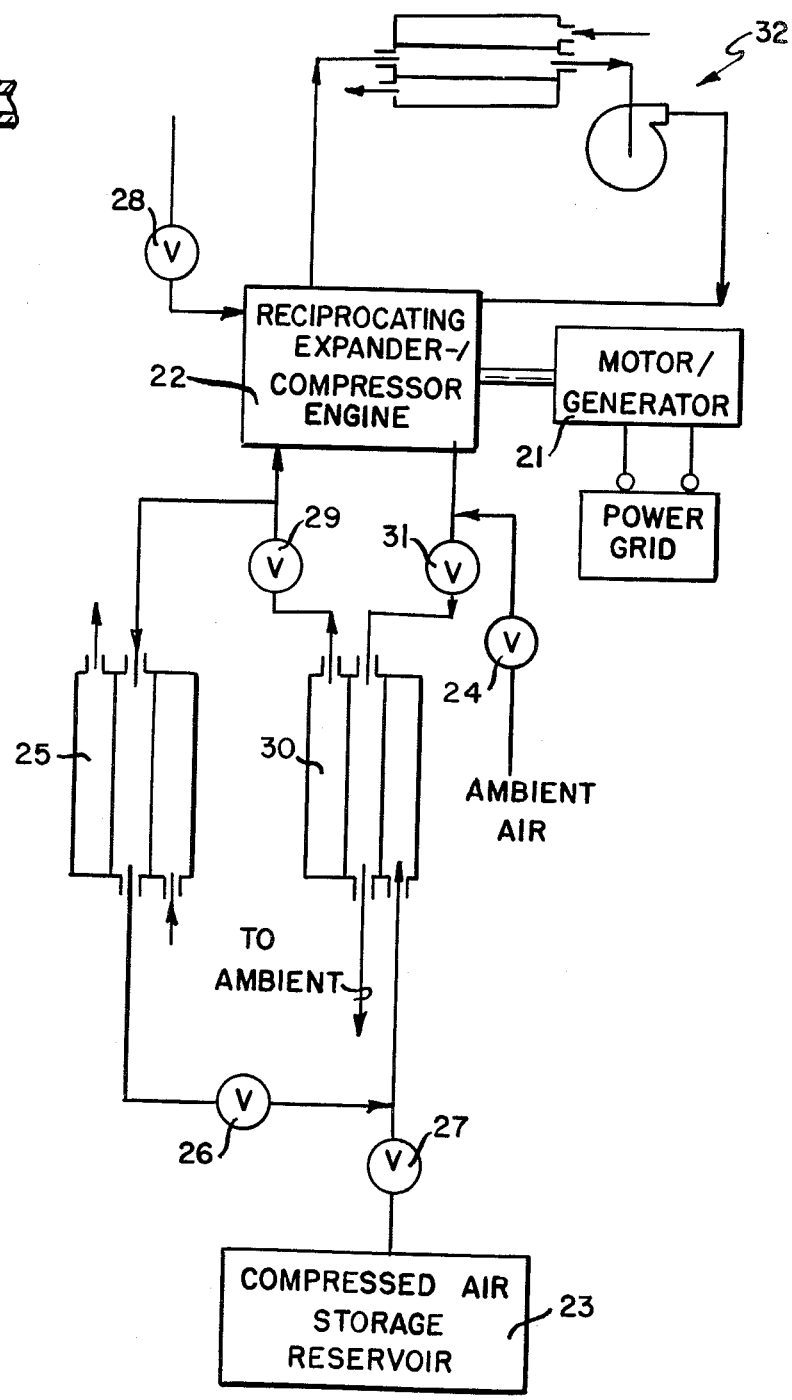

COMPRESSED AIR ENERGY STORAGE SYSTEM

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to an electrical power generating plant including a Compressed Air Energy Storage (CAES) System. More particularly, this invention relates to a CAES system which stores excess power from a power grid during off-peak hours, and returns the stored energy to the power grid when required during peak hours. More particularly, this invention relates to a CAES system which uses a piston engine which is operated as an air compressor during off-peak hours to store excess electrical energy from the power grid in the form of compressed air, and is operated as an expander during peak hours to convert the compressed air along with combustible fuels ultimately into electrical energy for the power grid.

The main objective of the electric utility industry is to supply power to the consumer at the lowest possible cost. This has led to the development of large sophisticated nuclear and fossil-fuel-fired steam generating plants. For both technical and economical reasons, these plants should be operated at a steady load. However, to meet daily and seasonal fluctuations in power demand, the industry uses so-called peaker units. The most common form of these units are gas turbine systems which use premium fuels such as natural gas or oil.

Due to our limited supply of natural gas and oil in this country and the current problems in the supply of petroleum fuel from foreign sources, premium fuel has become very expensive and the long-term supply is uncertain. Therefore, electric utilities have been investigating better ways of utilizing or even eliminating the use of premium fuels for peaker units and at the same time operating their large power plants at steady or constant load. This has led to the investigation of energy storage systems.

Studies conducted by electric utilities indicate that CAES power plants are attractive for consideration as an energy storage system. CAES plants which are presently being considered by electric utilities consist of four subsystems: a turbine system; compressor system; air storage reservoir; and a motor/generator. In a CAES plant, off-peak power is used to drive a compressor and the compressed air is subsequently stored in an underground reservoir. Peak power is generated using the stored air together with premium fuel, which is burned in a combustion chamber. In contrast to conventional gas turbine peaker units, the power generating system of a CAES plant is uncoupled from the compressor system so that each system operates independently of the other. The uncoupling of the turbine and compressor system permits the utilization of the full power output of the turbine system to drive the generator. In a conventional gas turbine peaker unit, about one-half to two-thirds of that output is used to operate the compressor. In a CAES plant, therefore, the required capacity (i.e., the gross power output) of the turbine system, as well as the quantity of fuel needed, will be reduced by the same fraction. The required capacity of the compressor system will also be reduced but the amount depends upon the charging and discharging time of the air reservoir.

Various plant configurations are being evaluated by the electric utility industry for air storage pressures in the range of 10–80 atmospheres. Of critical importance to the feasibility of these systems is the total capital cost of plant construction. The storage reservoir is the most costly subsystem of a CAES plant. The size and consequently the cost of the reservoir is proportional to the amount of air needed to burn each pound of fuel supplied. For a CAES plant which uses a turbine-compressor pair, depending upon the inlet gas temperature of the turbine (e.g. 1000°–2000° F.), the air to fuel ratio can vary from 40–60 lbs. of air/lb. of fuel. With the engine described herein, the air to fuel ratio will be reduced to about 18–20 lbs. of air/lb. of fuel. This will be shown to yield a significant economic benefit.

SUMMARY OF THE INVENTION

According to the present invention, an internal combustion reciprocating engine is operable as a compressor during slack demand periods utilizing excess power from a power grid to charge air into an air storage reservoir and as an expander during peak demand periods to feed power into the power grid utilizing air obtained from the air storage reservoir along with combustible fuel. Preferably the internal combustion reciprocating engine is operated at high pressure and a low pressure turbine and compressor are also employed for air compression and power generation.

BRIEF DESCRIPTION OF THE DRAWINGS

The invention will next be described in connection with the accompanying drawings wherein:

FIG. 1 is a schematic view of a reciprocating engine employed in the present invention, FIG. 2 is a schematic representation showing the basic features of a compressed air energy storage plant according to the present invention.

DETAILED DESCRIPTION OF THE PREFERRED EMBODIMENT

Figure 3:
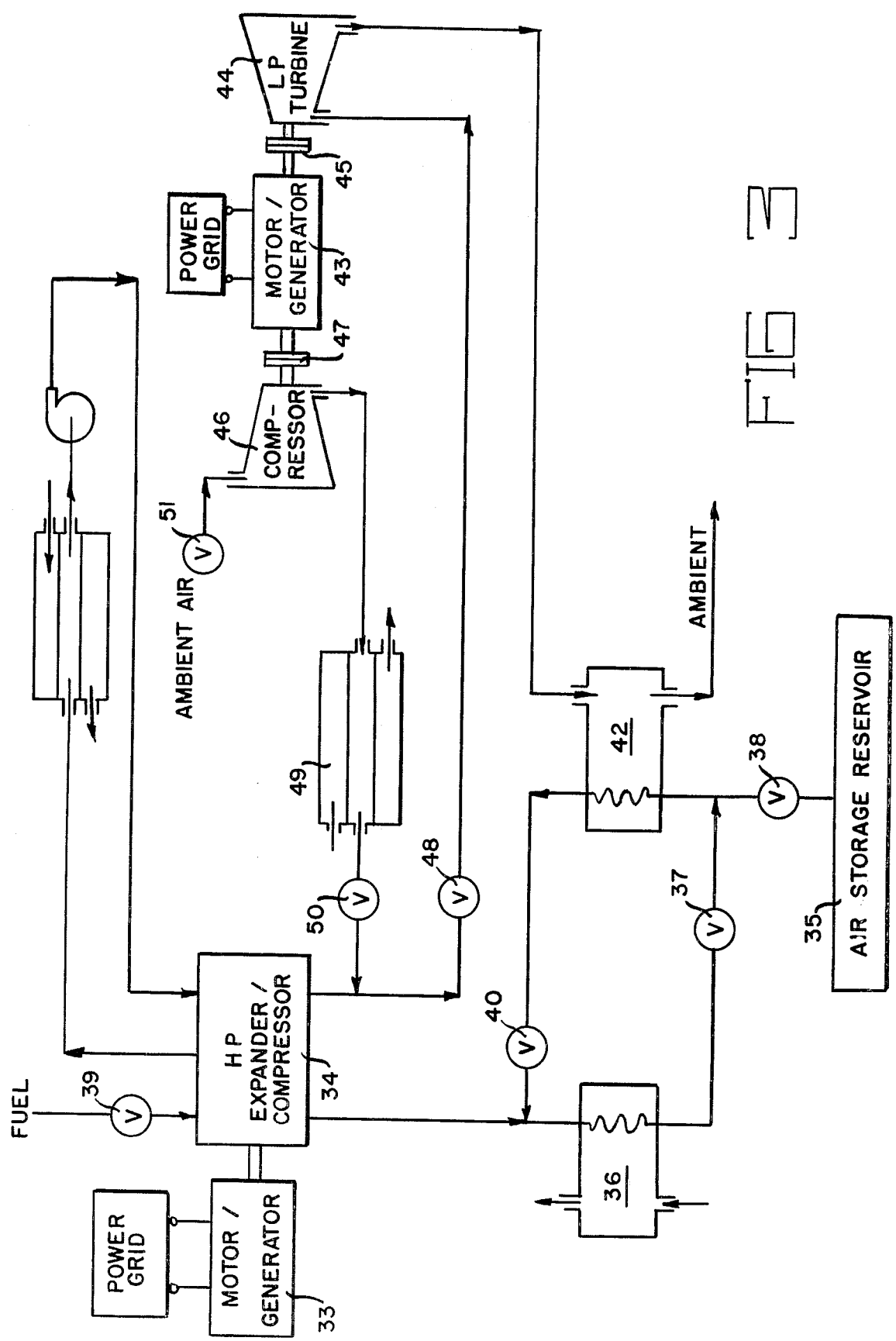
FIG. 3 is a schematic representation of a hybrid plant employing both a high-pressure reciprocating engine useable in both compression and expansion modes and a low-pressure turbine, this plant constituting the best mode of carrying out the invention presently known to the inventors.

Referring first to FIG. 1, cylinder 10 provided with cylinder head 11 has piston 12 reciprocably mounted therein. Piston 12 is reciprocated conventionally by connecting rod 13, crank 14 and a crankshaft (not shown). Valve 15 serves as inlet for air entering cylinder 10 through passage 16. Valve 17 serves as outlet valve for exhaust gases leaving the cylinder through passage 18 and valve 19 is employed to inject fuel into the cylinder. A water jacket 20 surrounds the cylinder. A spark plug or glow plug may be included in cylinder head 11.

It will be appreciated that the reciprocating engine as thus described is very similar to the diesel engine cylinder shown in FIG. 3 of U.S. Pat. No. 2,676,752 to Ochel et al. As will become apparent hereinafter, this engine functions differently in the method and system claimed herein than it does in Ochel et al.

Referring next to FIG. 2, a motor/generator 21, coupled to a reciprocating engine 22 which is operable either as an expander or as a compressor, is driven as a generator by reciprocating engine 22 during peak demand periods to feed power into a power grid and is operated as a motor using power from the power grid to drive the reciprocating engine as a compressor during slack demand periods to charge a storage reservoir 23 with compressed air. Ambient air is admitted to reciprocating engine 22 through valve 24.

In the air storage mode, air compressed in reciprocating engine 22 is cooled in aftercooler 25 and, after passing through valve 26 in the outlet line therefrom, is charged to reservoir 23 through valve 27. In the power generation mode, fuel is injected into reciprocating engine 22 through valve 28 and compressed air withdrawn from reservoir 23 through valve 27 is introduced into engine 22 through valve 29 after being heated in recuperator 30 by heat exchange with exhaust from engine 22 which is admitted to recuperator 30 through valve 31. Cooling water is circulated through the water jacket for the engine (see FIG. 1) by cooling system 32, removing part of the heat of compression. This heat removal reduces compression energy since the compression process approaches isothermal compression.

During the compression mode of operation, valves 28, 29 and 31 are closed, the motor/generator operates as a motor receiving off-peak power from a base-load power plant, and the engine operates as a reciprocating compressor. In the expansion (i.e. power generation) mode of operation, valves 24 and 26 are closed. The motor/generator operates as a generator and the engine operates as an expander.

Comparing the above-described plant configuration with that of a turbine based CAES plant, the expander/compressor engine replaces the turbine and combustor and the compressor. Furthermore, the aftercooler is smaller than that of a conventional plant because part of the heat of compression is removed in the cooling water and because this system uses less air than a conventional CAES system. However, engine cooling water requires an additional circulation pump and radiator.

It will be noted that the engine is connected through a shaft to the motor/generator. The engine system may consist of several separate engines that are manifolded together. Motor/generator units may be connected to each separate engine or to a combination of engines.

At the pressures now contemplated for CAES plants—3-10 megaPascals—the reciprocating engine will require at least two stages—a high-pressure (HP) stage and a low-pressure (LP) stage. In a possible design for such a plant, the LP stage receives hot exhaust gas from the HP stage in the power generation mode and thus the LP stage may not require a fuel injector or spark plug. When the engine operates as a reciprocating air compressor, an intercooler is necessary between stages to remove the heat of compression in order to prevent autoignition of the piston lubricating oil.

In such a system fewer HP engines are required than LP engines and a lower proportion yet of HP engines is required when the engines are used as reciprocating compressors. Thus less than half of the engines need dual valving for both compression and expansion operations. An economic evaluation of the plant (discussed more in detail hereinafter) shows that cost benefits are obtained only from the use of an expander/compressor reciprocating engine in the HP stage and a conventional gas turbine is best used in the LP stage. Such a system will next be described.

In the embodiment of FIG. 3, a motor generator 33, coupled to a high-pressure reciprocating engine 34 which may be operated either as an expander or as a compressor, is driven as a generator by engine 34 during peak demand periods to feed power into a power grid and is operated as a motor using power from the power grid to drive the reciprocating engine as a compressor during slack periods to charge an air storage reservoir 35. In the energy storage mode, air compressed in engine 34 is cooled in aftercooler 36, there being a valve 37 in the outlet line therefrom, and is then charged to reservoir 35 through valve 38. In the power generation mode, fuel is injected into engine 34 through valve 39 and air is withdrawn from reservoir 35 through valve 38 and is admitted to engine 34 through valve 40 after being heated in recuperator 42 by passing in heat exchange relationship with exhaust gases from the turbomachinery.

The turbomachinery is conventional, consisting of a motor generator 43 coupled to a low-pressure turbine 44 through a disconnectable coupling 45 and also coupled to an axial compressor 46 through a disconnectable coupling 47. In the power generating mode, coupling 47 is disconnected and motor/generator 43 is operated as a generator by LP turbine 44, supplying power to the power grid. Exhaust air from engine 34 is still at a high enough pressure and temperature to service LP turbine 44 and is thus directed thereto through valve 48. The residual heat in the exhaust air from turbine 44 is employed in recuperator 42, as has been mentioned. In the energy storage mode, coupling 45 is disconnected and compressor 46 is operated by motor/generator 43 compressing air which is delivered to engine 34 after having been cooled in intercooler 49. Valve 50 is in the line between intercooler 49 and engine 34 and valve 51 controls the introduction of ambient air into compressor 46. This also represents the air input into expander/compressor engine 34 which is further compressed therein for delivery to air storage reservoir 35.

During the compression mode of operation, valves 39, 40 and 48 are closed, both motor/generator units operate as motors receiving power from a base plant, coupling 45 is disconnected, and the HP engine 34 operates as a compressor. During expansion, valves 37, 50 and 51 are closed, both motor/generator units operate as generators, coupling 47 is disconnected, and the HP engine operates as an expander.

A basic description of the operating characteristics and design features of the expander/compressor engine employed will next be presented. During the compression mode of operation, the engine operates as a reciprocating compressor which is driven by an electric motor. When the piston reaches top-dead-center (TDC), the intake valve opens (exhaust valve is closed) and air is then drawn into the cylinder as the piston moves toward bottom-dead-center. At bottom-dead-center (BDC), the intake valve closes and the piston moves upward. Slightly before TDC, the exhaust valve opens and the compressed air is then expelled from the cylinder.

During expander operation, the engine operates as a power expander which drives a generator. Compressed air from a storage reservoir and fuel are burned and expanded in the cylinder. Two different methods of internal combustion are possible. These methods are called *constant pressure combustion* and *pressure-limited-combustion*.

Constant-Pressure-Combustion

Slightly before a given cylinder in the engine reaches TDC, the intake valve opens (the exhaust valve is closed) and preheated compressed air from the storage reservoir flows into the clearance volume. During the air filling process, fuel is injected into the cylinder. A spark-plug or glow-plug, which is located in the cylinder head, ignites the air-fuel mixture, the piston moves downward, and the intake valve closes. At BDC, the exhaust valve opens, and as the piston moves upward, the exhaust gas is expelled.

This combustion process occurs as both air and fuel flow into the cylinder. A spark-plug or glow-plug is necessary to reduce ignition delay and improve combustion efficiency.

Pressure-Limited-Combustion

For this method of combustion, the intake valve opens before TDC (the exhaust valve is closed and the fuel injector is off) and preheated pressurized air from the storage reservoir flows into the cylinder. Slightly before TDC, the pressure in the cylinder reaches the reservoir pressure and the intake valve closes. As the piston moves to TDC, the trapped air is further compressed and its temperature increases. Near TDC, fuel is injected into the cylinder. Combustion occurs approximately at constant volume and a rapid pressure and temperature rise result. At BDC, the exhaust valve opens and, as the piston moves upward, the gas is expelled.

During this combustion process, the pressure and temperature rise can be controlled by the valve timing, fuel injection rate, and piston speed. The combustion process is similar to that of a conventional diesel engine. Due to the extra compression of the trapped air in the cylinder, the final temperature of the air will be sufficiently high for efficient auto-ignition of the fuel-air mixture, thus eliminating the need for a spark-plug or glow-plug.

It will be noted that this system employs a reversible HP expander/compressor engine in place of the HP turbine and combustor and booster compressor of a conventional CAES plant. A LP turbine and axial compressor are used for the low-pressure duty cycle of the plant. A low-pressure combustor is unnecessary since the exhaust of the HP expander is at a high temperature.

The basic advantage of the described invention is that the cost in energy of compressing the air required for operation of the engine as an expander occurs during slack demand periods. In Constant-Pressure-Combustion there is little or no energy loss in peak demand periods since air from the air storage reservoir is used without further compression in the engine cylinder. In Pressure Limited Combustion the energy loss is negligible compared to that in a conventional diesel engine since the pressure increase in the cylinder is small in comparison with the increase in pressure required for operation of a conventional diesel engine. Thus output of the engine during peak demand periods is essentially all available for electrical power generation.

In a conventional diesel engine much of the energy developed in the power stroke is lost in the compression stroke. Efficiency of a reciprocating engine operated as an expander as described herein is approximately twice that of a conventional two-stroke or four-stroke diesel engine.

A comparison between various CAES systems including a plant using compound engines as above described will next be given. Engine performance will be given in the context of overall plant operation as well as in terms of engine efficiency, temperature and pressure when operating as a power generator or compressor. Comparisons will be made of CAES plants having the reversible engines as described herein, the Huntorf facility and two other turbine-based designs.

A thermodynamic analysis was conducted of the plant schematically illustrated in FIG. 3. The analysis considered a constant-pressure combustion engine for high-pressure duty and a modified gas turbine for low-pressure operation. Overall CAES plant performance was evaluated in terms of four parameters: specific air flow rate (the amount of reservoir air required per unit of generated power), specific heat rate (the product of specific fuel consumption and the lower heating value of the fuel), the ratio of expansion power to compression power, and overall plant efficiency (plant output per total energy input).

The performance of a CAES plant using the compound-engine concept is compared to three turbine-based CAES plant systems in Table I; some performance characteristics of the expansion equipment are presented in Table II. The Huntorf plant, Huntorf, W. Germany, is included because it is the world's only operational CAES plant. The principal reason that the performance of the Huntorf plant is lower than the two other turbine-based plants is that presently it does not include a recuperator. Addition of a recuperator would bring all its system performance parameters closer to those of the near-term turbine system.

The near-term turbine system can be implemented using conventional turbomachinery. For this system, a modified steam turbine with an inlet gas temperature of 811° K. (1000° F.) can be used as the HP turbine. The LP turbine, which has an inlet gas temperature of 1144° K. (1600° F.), can be a modified gas turbine from a peaker unit. This turbine will not require vane or blade cooling but will require some auxiliary cooling.

The advanced turbine system selected for this study consists of an advanced HP turbine and a modified, high-temperature gas turbine from a peaker unit. The HP turbine, operating at 1366° K. (2000° F.) inlet gas temperature, will require significant amounts of cooling air. This turbine does not exist at the present time but represents an attainable extension to the state-of-the-art gas turbine technology. The LP turbine, which operates with an inlet gas temperature of 1366° K. (2000° F.), will also require a considerable amount of cooling air.

The data presented in Table I illustrate that a CAES plant using the compound-engine concept requires a significantly lower specific air flow rate than the turbine-based designs. For example, the compound-engine system requires 39% less air than the near-term turbine system. This situation is reflected in the favorable values shown for the ratio of expansion power to compression power and overall plant efficiency. Several factors enter into the low specific air flow value for the compressed engine, of which the most important is the required air/fuel ratio. Actual air/fuel ratios will be dictated by engine operation—that is, by the need to limit emissions or to operate at lower temperatures for longer engine life.

The plant heat rate is lower for the compound-engine system than the unrecuperated Huntorf design, but higher than the other two turbine-based designs. This result is partially caused by the higher operating temperatures of the HP engines. The advanced turbine system has a higher heat rate than the near-term turbine system for the same reason (i.e. additional fuel is required to raise combustion temperature). The incentive for using this turbine design is to improve other performance parameters.

In order to assess the economic feasibility of the compound-engine concept, the capital and operating costs of CAES plants using this system were estimated. In addition, costs for plants using turbine-based systems were also estimated for comparative purposes. The analysis was carried out using the performance information presented in the previous section. The costs are based on a plant having a 20-hour nominal storage capacity which could yield a generation time of 2190 hours/year. The storage cavern was assumed to be a water-compensated, mined cavern with a storage pressure of 7.09 MPa (70 atm) and storage temperature of 322° K. (120° F.).

Capital costs were divided into direct and indirect categories. The direct capital costs consist of those for the expansion and compression equipment, the storage cavern, the surface reservoir, and the balance of plant. The storage cavern cost included the costs of the cavity, the air and water shafts, development and mobilization, and completion. The costs of the air and water shafts were based on cavern depth which was determined from the selected air storage pressure. The size of the cavity was estimated from the specific air flow and nominal storage capacity required, with a 10% capacity margin added. The surface reservoir was considered in the analysis because a water-compensated (constant-pressure) system was chosen. The balance of plant includes items such as clutches, motor/generators, a recuperator, combustors for turbine-based systems, fuel storage, intercoolers, an aftercooler, electrical power systems, land, and the plant structure. Indirect costs include allowance for contingency (15% of direct costs), engineering and administration (10% of direct costs), and escalation (30% of direct costs, contingency, and engineering and administration).

The operating costs of a CAES plant include the capital charge, fuel costs for the engine and/or combustors, the off-peak charge for the electricity required to run the compressors, and the charges for operation and maintenance. The annual capital charge was estimated from the total capital cost and was based on a fixed capital charge rate of 18% per year, assuming a yearly generation time of 2190 hours. The fuel cost was estimated using a cost rate of $8.53/$10^3$ kWh ($92.50/$10^6$ Btu). Electricity costs were figured using a charge rate of 15 mills/kWh.

Performance and capital cost data for the expansion equipment of the various power generation systems considered are presented in Table II. For the turbine-based systems, an LP turbine that would generate 200 Mw was first selected. The HP turbine was then selected to match the flow requirements of the LP turbine. Following the selection of the expansion equipment, the size of the storage reservoir to provide the required air flow was estimated. For the modified steam-turbine used as the HP expander for the near-term turbine system, the output and cost had to be obtained using an interpolation scheme since flow rates presented could not be matched directly to the flow requirements of the LP turbine. The turbine costs are based on assumed economies of scale resulting from a total market potential of 50 identical units. The cost of HP reciprocating engines was obtained from Argonne Report ANL/CES/TE-77-1. This reference provides capital cost information on large oil-fired diesel engines. The largest engines available were chosen and the performance evaluation indicated that eight of the engines would be required. The cost is a conservative estimate since some of the auxiliaries will not be required for the present application. The costs for both the turbines and reciprocating engines include allowances for ducting, mountings, and installation.

A comparison of cost estimates (1976 dollar values) for CAES plants using the various types of expansion/compression equipment is presented in Table III. The total capital cost of the near-term and advanced turbine systems are nearly identical. The operating cost for the advanced turbine system was slightly less (3.4%) than for the near-term turbine system—the main difference being due to lower electricity costs for compressor operation resulting from the smaller storage capacity required. The balance of plant capital cost was found to be relatively insensitive to CAES design parameters for turbine-based systems and was estimated to be $80/kW.

Two separate cost scenarios were considered for the compound-engine system. In the first one, the flow from the HP reciprocating engines was matched to that required by the 200-MW LP turbines. The resulting system required eight modified diesel engines which produced a power output of 238 MW. For the compression portion of the CAES cycle, conventional turbocompressors were used. In the second scenario, the reciprocating engines were modified to allow for reversible operation. Thus, the reciprocating engines could function not only as HP expanders, but also as booster compressors. The cost of this reversible engine was assumed to be about 20% more than an advanced HP turbine (on a specific cost basis). However, only four of the eight engines would have to be reversible in order to provide the required compressed air. All other direct plant costs for this second scenario were assumed to be the same as for the first scenario.

For both cases, the balance of plant costs were lower than for the turbine-based systems. This result occurs because of the elimination of the combustors and reduction in size of the recuperator for the compound-engine system. It was assumed that the cooling system costs of the reciprocating engine would be balanced by savings resulting from the elimination of some of the auxiliaries included in the diesel-engine costs and the reduction in size of the intercoolers and aftercooler. Total operating costs were figured in a manner similar to that used for the turbine system. The operating and maintenance costs for the diesel engines were estimated from data presented in ANL/CES/TE-77-1. These costs were found to be of similar magnitude as those for turbine-based systems.

As can be seen from Table III, significant savings in both capital and operating costs result from the use of compound-engine systems in CAES plants rather than conventional turbine systems. By using a compound-engine system with conventional turbocompressors, capital costs are reduced by 11.8% as compared to the near-term turbine system and 11.6% as compared to the advanced turbine system. Although the storage cavern size was the same for both the plant using an advanced turbine system and that using a compound-engine system, the use of the compound engine increases power output from about 312 to 438 MW, thus resulting in a lower specific cost for the storage cavern and surface reservoir. Operating costs are reduced by 11.2% when this compound-engine system is used. Again, the higher output of the plant results in lower specific operating costs. By designing the reciprocating engine for reversible operation and applying the cost scenario described for this system, capital costs could be reduced by as much as 17.4% and operating costs could be reduced by 14.1% as compared to the near-term turbine system. In reality, the actual reduction in costs probably lies somewhere between the costs for the two compound-engine scenarios.

TABLE I

Comparison of Performance Parameters for Compressed Air Energy Storage Plants Using Various Types of Expansion/Compression Equipment

|  | Huntorf Plant | Plant Using Near-Term Turbine System | Plant Using Advanced Turbine System | Plant Using Compound-Engine System |
|---|---|---|---|---|
| Rerservoir Pressure, MPa | 6.89 | 7.09 | 7.09 | 7.09 |
| (atm) | (68) | (70) | (70) | (70) |
| (psia) | (1000) | (1029) | (1029) | (1029) |
| Specific Air Flow Rate, kg/MJ | 1.46 | 1.41 | 1.20 | 0.86 |
| ($lb_m$/kWh) | (11.59) | (11.18) | (9.55) | (6.80) |
| Specific Heat Rate, J/J | 1.61 | 1.11 | 1.17 | 2.36 |
| (Btu/kWh) | (5500) | (3793) | (4000) | (4726) |
| Expansion Power/Compressin Power | 1.24 | 1.27 | 1.68 | 2.36 |
| Overall Efficiency, % | 41.5 | 54.4 | 56.7 | 55.4 |

TABLE II

Performance and Cost of Expansion Equipment

|  | Near-Term Turbine System | | Advanced Turbine System | | Compound-Engine System | |
|---|---|---|---|---|---|---|
|  | | | | | High-Pressure | |
|  | High-Pressure Turbine[a] | Low-Pressure Turbine | High-Pressure Turbine | Low-Pressure Turbine | Reciprocating Engine[b] | Low-Pressure Turbine |
| Inlet Pressure, MPa | 5.85 | 1.15 | 5.96 | 1.15 | 5.96 | 1.15 |
| (psia) | (848) | (167) | (865) | (167) | (865) | (167) |
| Inlet or Maximum Temperature, K | 811 | 1144 | 1366 | 1366 | 2102 | 1366 |
| (°F.) | (1000) | (1600) | (2000) | (2000) | (3324) | (2000) |
| Total Air Mass Flow[c], kg/s | 371 | 371 | 296 | 376 | 296 | 376 |
| ($lb_m$/s) | (817) | (817) | (653) | (829) | (653) | (829) |
| Net Power Output, MW | 92.0 | 200.0 | 111.7 | 200.0 | 238.0 | 200 |
| Cost[d,e], $/kW | 21.9 | 11.5 | 38.0 | 17.2 | 51.3 | 17.2 |

[a]Modified steam turbine.
[b]Eight modified diesel engines.
[c]Includes coolant flow.
[d]Includes ducting, mountings, and installation.
[e]Expressed in 1976 dollars.

TABLE III

Comparison of Cost Estimates for Compressed Air Energy Storage Plants Using Various Types of Expansion and Compression Equipment[a,b]

|  | Turbine Systems | | Compound-Engine Systems | |
|---|---|---|---|---|
|  | | | Using Conventional | Using Reversible High-Pressure |
|  | Near-Term | Advanced | Turbocompressors | Expanders/Compressors |
| Capital Cost, $/kW |  |  |  |  |
| Expansion/Compression Equipment[c] | 35.5 | 43.4 | 49.0 | 38.6 |
| Storage Cavern | 65.8 | 58.4 | 41.6 | 41.6 |
| Surface Reservoir | 5.5 | 4.7 | 3.4 | 3.4 |
| Balance of Plant | 80.0 | 80.0 | 70.8 | 70.8 |
| Indirect Costs[d] | 116.8 | 116.5 | 103.0 | 96.5 |
| Total | 303.6 | 303.0 | 267.8 | 250.9 |
| Difference[h] |  | −0.2% | −11.8% | −17.4% |
| Operating Costs, mills/kWh |  |  |  |  |
| Capital Charge[e] | 25.0 | 24.9 | 22.0 | 20.6 |
| Fuel[f] | 9.5 | 10.0 | 11.8 | 11.8 |
| Electricity[g] | 10.9 | 8.9 | 6.3 | 6.3 |
| Operating & Maintenance | 2.0 | 2.0 | 2.0 | 2.0 |
| Total | 47.4 | 45.8 | 42.1 | 40.7 |

TABLE III-continued
Comparison of Cost Estimates for Compressed Air Energy Storage Plants Using Various Types of Expansion and Compression Equipment[a,b]

|  | Turbine Systems | | Compound-Engine Systems | |
|---|---|---|---|---|
|  | Near-Term | Advanced | Using Conventional Turbocompressors | Using Reversible High-Pressure Expanders/Compressors |
| Difference[h] |  | −3.4% | −11.2% | −14.1% |

[a] Costs are expressed in 1976 dollar values.
[b] The storage cavern was assumed to be a water-compensated mined type with storage pressure = 7.09 MPa (70 atm) and storage temperature = 322 K (120° F.). Nominal storage capacity was assumed to be 20 hr yielding a generation time of 2190 hrs/yr.
[c] Turbines, reciprocating engines and/or compressors (including ducting, mountings and installation).
[d] Indirect costs consist of engineering and administration (10% of direct costs), contingency (15% of direct costs), and escalation and interest during construction (30% of direct costs plus engineering, administration and contingency).
[e] The capital charge was 18% per year for a generation time of 2190 hrs/yr.
[f] The fuel cost used was $8.53/10³ kWh ($2.59/10⁶ Btu).
[g] The electricity cost used was 15 mills/kWh.
[h] As compared to the near-term turbine system.

The embodiments of the invention in which an exclusive property or privilege is claimed are defined as follows:

1. A compressed air energy storage system comprising an internal combustion reciprocating engine, an air storage reservoir, means external to said reciprocating engine for operating said reciprocating engine as an air compressor during slack demand periods for power, means for charging the storage reservoir with air compressed by the reciprocating engine, means for feeding air from the storage reservoir and fuel to the reciprocating engine during peak demand periods for power, and means for burning the air/fuel mixture whereupon the engine operates as an expander, developing power available for external use.

2. System according to claim 1 including an aftercooler for cooling air compressed in the reciprocating engine prior to storing it in the air storage reservoir and a recuperator for heating air fed to the reciprocating engine from the storage reservoir by heat exchange with exhaust air from the reciprocating engine.

3. System according to claim 2 wherein said internal combustion engine operates at a high pressure and further including a motor/generator disconnectedly coupled to both a low-pressure turbine and an axial compressor, means external to the system for operating said motor/generator as a motor during slack demand periods, said motor/generator being coupled to the compressor, means for feeding air compressed by the compressor to the reciprocating engine for further compression, means for feeding exhaust air from the reciprocating engine to the low-pressure turbine during peak demand periods, said motor/generator being coupled to the turbine, whereby the motor/generator is operated as a generator by the turbine, developing power available for utilization external to the system.

4. System according to claim 1, 2 or 3, further including an intercooler for cooling the air compressed in the axial compressor prior to its introduction into the reciprocating engine.

5. Method of operating an electrical power generating plant comprising:
   in periods of slack demand for power, operating an internal combustion reciprocating engine as a two-stroke compressor utilizing excess power from a power grid and storing the air compressed thereby and
   in periods of peak demand for power, feeding stored air and fuel to the reciprocating engine, burning the fuel/air mixture to operate the reciprocating engine as a two-stroke expander, and feeding power developed thereby to the power grid.

6. Method according to claim 5 comprising:
   during peak demand periods, operating and reciprocating engine at high pressure as an expander, feeding exhaust therefrom to a low-pressure turbine to operate the turbine, feeding power developed thereby to a power grid, and
   during slack demand periods, compressing air with excess power from the power grid and feeding this air to the reciprocating engine for further compression therein.

7. Method according to claim 6 wherein the reservoir pressure is 70 atmospheres, the inlet pressure to the HP engine is 865 psia, and the inlet pressure to the LP turbine is 167 psia.

* * * * *